US010108499B2

(12) United States Patent
Ibe (10) Patent No.: US 10,108,499 B2
(45) Date of Patent: Oct. 23, 2018

(54) INFORMATION PROCESSING DEVICE WITH WATCHDOG TIMER (71) Applicant: MITSUBISHI ELECTRIC CORPORATION, Tokyo (JP)

(72) Inventor: Kengo Ibe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/556,505

(22) PCT Filed: Mar. 24, 2015

(86) PCT No.: PCT/JP2015/001649
§ 371 (c)(1),
(2) Date: Sep. 7, 2017

(87) PCT Pub. No.: WO2016/151626
PCT Pub. Date: Sep. 29, 2016

(65) Prior Publication Data
US 2018/0121294 A1    May 3, 2018

(51) Int. Cl.
*G06F 11/07*    (2006.01)
*G06F 11/14*    (2006.01)
*G06F 11/30*    (2006.01)
*G06F 1/14*    (2006.01)

(52) U.S. Cl.
CPC ............ *G06F 11/1458* (2013.01); *G06F 1/14* (2013.01); *G06F 11/0757* (2013.01); *G06F 11/30* (2013.01); *G06F 11/076* (2013.01); *G06F 11/0754* (2013.01); *G06F 2201/84* (2013.01)

(58) Field of Classification Search
CPC . G06F 11/0754; G06F 11/0757; G06F 11/076
See application file for complete search history.

(56) References Cited

U.S. PATENT DOCUMENTS

| 9,898,311 B1* | 2/2018 | Hartmann | G06F 9/44505 |
| 2002/0124213 A1* | 9/2002 | Ahrens, Jr. | G06F 11/0712 714/57 |
| 2003/0037172 A1 | 2/2003 | Lacombe et al. | |
| 2003/0131252 A1* | 7/2003 | Barton | G06F 11/1417 713/193 |

(Continued)

FOREIGN PATENT DOCUMENTS

| CN | 101882097 A | 11/2010 |
| JP | 8-292893 A | 11/1996 |

(Continued)

*Primary Examiner* — Joseph O Schell
(74) *Attorney, Agent, or Firm* — Birch, Stewart, Kolasch & Birch, LLP (57) ABSTRACT An information processing device including a recording module to record a program having cleared a watchdog timer; a determination module to refer, when the watchdog timer expires, to the recording module to determine an application to be executed from among a plurality of applications, and to determine an operating system to be executed from among a plurality of operating systems; an execution module to execute the operating system determined by the determination module; and a communication module to notify the operating system to be executed of the application to be executed.

4 Claims, 11 Drawing Sheets (56) References Cited

U.S. PATENT DOCUMENTS

| | | | | |
|---|---|---|---|---|
| 2004/0153724 | A1* | 8/2004 | Nicholson | G06F 11/0709 714/6.11 |
| 2006/0070037 | A1* | 3/2006 | Canning | G06F 11/34 717/127 |
| 2011/0145807 | A1* | 6/2011 | Molinie | G06F 8/65 717/170 |
| 2012/0030670 | A1* | 2/2012 | Vijay | G06F 9/45558 718/1 |
| 2012/0210165 | A1* | 8/2012 | Lambert | G06F 11/1417 714/15 |
| 2016/0149773 | A1* | 5/2016 | Moscovici | H04L 41/5054 714/4.12 |
| 2016/0188345 | A1* | 6/2016 | Chen | G06F 9/4403 713/2 |

FOREIGN PATENT DOCUMENTS

| | | |
|---|---|---|
| JP | 11-282725 A | 10/1999 |
| JP | 2001-159974 A | 6/2001 |
| JP | 2003-50712 A | 2/2003 |
| JP | 2004-348546 A | 12/2004 |
| JP | 2007-52520 A | 3/2007 |
| JP | 2010-108447 A | 5/2010 |
| JP | 2011-258032 A | 12/2011 |
| JP | 2012-113616 A | 6/2012 |
| JP | 2013-73258 A | 4/2013 |

\* cited by examiner

INFORMATION PROCESSING DEVICE WITH WATCHDOG TIMER

TECHNICAL FIELD

The present invention relates to failure analysis in an information processing device.

BACKGROUND ART

Information processing devices used in a system such as a power plant system and a train car system are provided with a watchdog timer (hereinafter, referred to as WDT) in order to monitor a hung-up of the system due to a software failure. If the timer is not cleared within a predetermined time (time until timeout), the WDT determines that the system has hung up, and resets it. By using the WDT, even when a system failure makes the system nonoperational, the WDT can reset the system to operate it again.

However, in a case where failures frequently occur, the WDT's reset processing for the system results in another failure, thereby repeating the reset processing and leaving the situation unimproved.

To cope with this problem, for example in Patent Document 1, a method is disclosed in which two programs are stored in a ROM (Read Only Memory) so that when a failure occurs to a program, the other program is activated for trying to recover the system.

Patent Document 2 discloses a method in which in accordance with the WDT timeout occurrence count, a selector circuit selects a bootloader used for failure occurrence state as a bootloader to be activated, to output the failure occurrence situation.

PRIOR ART DOCUMENT

Patent Document

Patent Document 1: Japanese Patent Laid-Open Publication No. 2004-348546
Patent Document 2: Japanese Patent Laid-Open Publication No. 2012-113616

SUMMARY OF THE INVENTION

Problems to be Solved by the Invention

Both of the techniques described in Patent Documents 1 and 2 suggest the possibility that when a system failure occurs, the system recovers by switching all of programs currently operating to those for failure occurrence to perform a failure analysis.

Therefore, if a program to be checked by the failure analysis is a large scale program including an operating system, an enormous amount of logs needs to be checked in the failure cause investigation, taking a quite long time to identify a failure cause.

Means for Solving the Problem

The present invention is made to solve the problem, and an information processing device is provided which includes a recording module to record a program having cleared a watchdog timer; a determination module to refer, when the watchdog timer expires, to the recording module to determine an application to be executed from among a plurality of applications, and to determine an operating system to be executed from among a plurality of operating systems; an execution module to execute the operating system determined by the determination module, and a communication module to notify the operating system to be executed of the application to be executed.

Effects of the Invention

According to the present invention, it becomes possible to identify a failure cause in a short time.

EMBODIMENT FOR CARRYING OUT THE INVENTION

Embodiment 1

Figure 1:
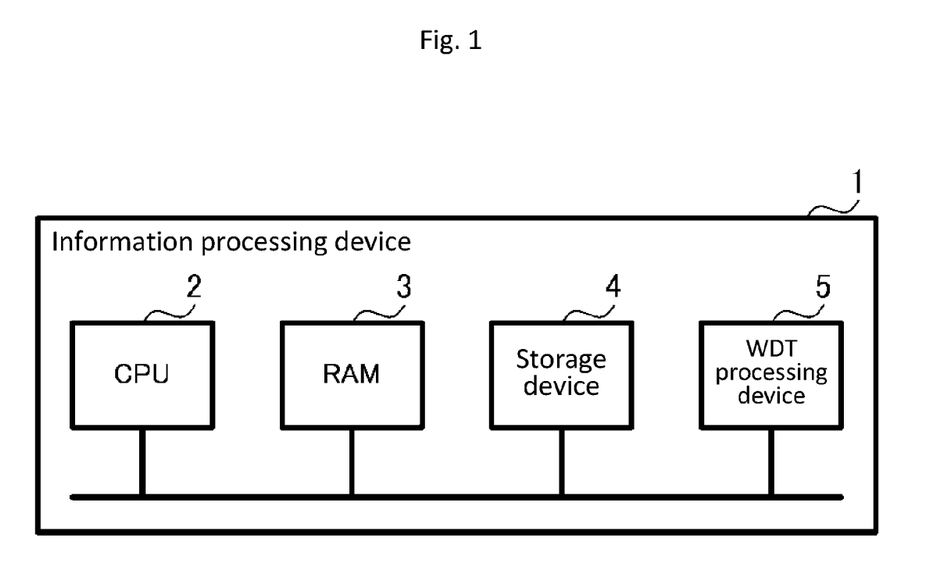
FIG. 1 is a hardware configuration diagram of an information processing device according to Embodiment 1.

FIG. 1 is a hardware configuration diagram of an information processing device 1 according to the present invention. In FIG. 1, a CPU 2 (Central Processing Unit) is an arithmetic unit responsible for the overall control of the information processing device 1; a RAM 3 (Random Access Memory) is a main storage device used as a work area of the CPU 2; a storage device 4 is a nonvolatile storage device such as a flash memory to store a program including an operating system (hereinafter, referred to as OS) and an application (hereinafter, referred to as AP) which runs on the OS; a WDT processing device 5 is a reset device to restart the system when clearing processing (processing to reset the WDT to a preconfigured value) has not been performed by an AP or an OS for a certain period and a timeout subsequently occurs.

Figure 2:
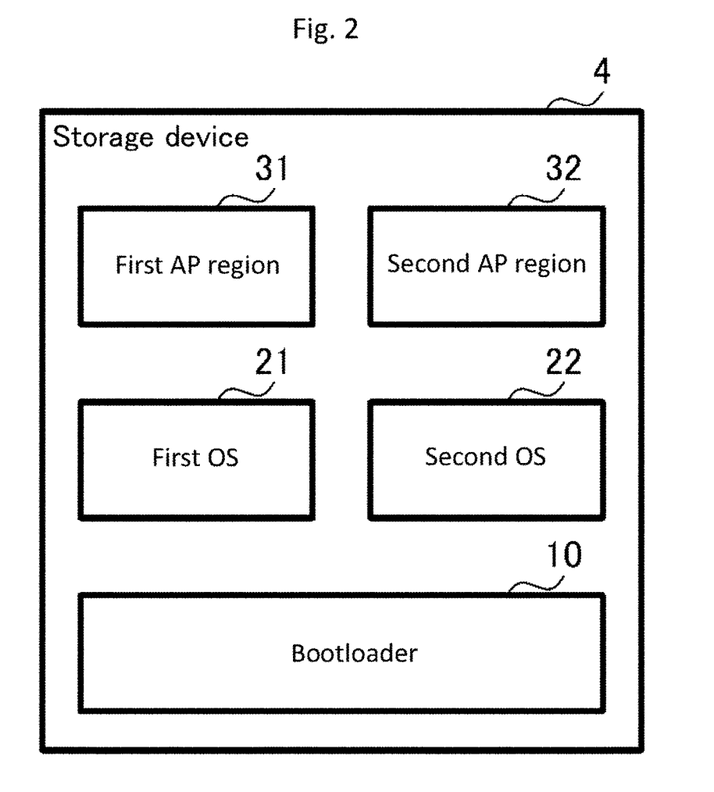
FIG. 2 is a block diagram showing a configuration of a storage device of Embodiment 1.

FIG. 2 is a block diagram showing a configuration of the storage device 4 and the content of the storage of this embodiment. The storage device 4 includes a bootloader 10, a first OS 21, a second OS 22, a first AP region 31, and a second AP region 32. The bootloader 10 is a program which is called by the CPU 2 being a control module, immediately after power is applied to the information processing device 1. When called by the CPU 2, the bootloader 10 initializes the hardware of the information processing device 1, and then boots the OS.

The first OS 21 and the second OS 22 are basic software items which make applications operate. The first AP region 31 and the second AP region 32 are software groups of applications such as a file system and commands.

Note here, it is assumed that the first OS 21 and the second OS 22 each include an internal process for clearing WDT (WDT clearing processing in the OSs). The WDT clearing processing in the OS may be performed such that: a timer used for the OS is set so as to create interrupts at a shorter interval than the WDT's timeout; and, the WDT is cleared in the interrupt service routines, tasks or threads.

Also it is assumed that a WDT clearing AP for clearing the WDT is included in each of the AP region 31 and the AP region 32, to be executed as an AP in its AP region. Similarly with the WDT clearing processing in the OS, the WDT clearing AP may be performed such that: the timer used for the OS is set similarly with the WDT clearing processing in the OS; and the WDT is cleared in the interrupt service routines, tasks and threads.

Note here that, in a case where only a single AP is provided in the AP region, it is assumed that the process to clear the WDT is included in the AP itself.

Besides the processing described above, the WDT clearing processing in the OS and the WDT clearing AP notify the WDT processing device 5 of their self-identification information.

When a plurality of devices for performing WDT clearing processing with respect to the WDT processing device are provided, the WDT processing device may determine which device has cleared, to record this determination information. Explanation on timing of the WDT clearing processing will be made with reference to FIG. 3.

Figure 3:
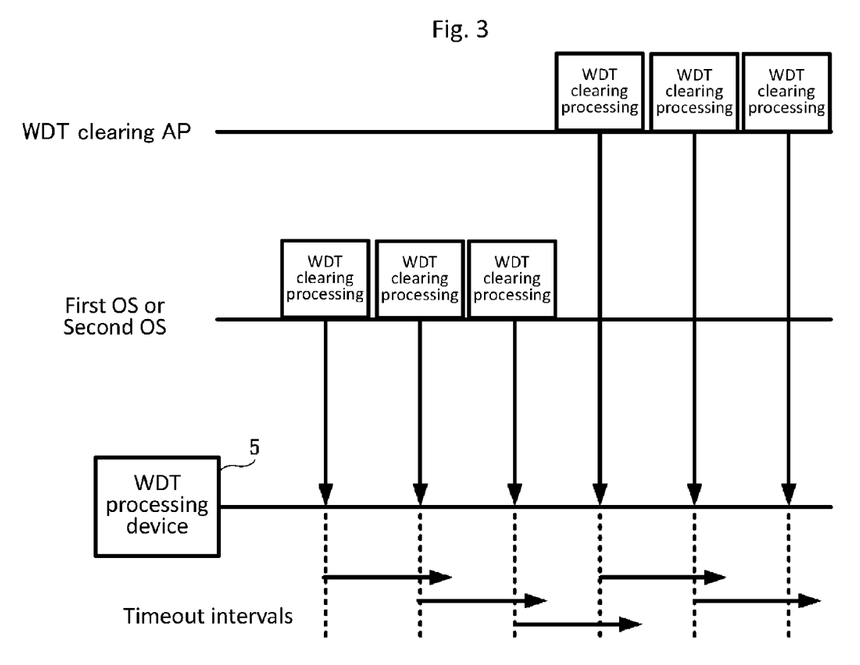
FIG. 3 is a diagram showing an example of timing of WDT clearing processing of Embodiment 1.

FIG. 3 is a diagram showing an example of timing of the WDT clearing processing. FIG. 3 shows that if a predetermined timeout period elapses, timeout occurs in the WDT processing device 5. To cope with this, the internal WDT clearing processing in the first OS 21 or the second OS 22 prevents timeouts in the WDT processing device by generating interrupts at a period shorter than the timeout period of the WDT processing device. Similarly, the WDT clearing processing of the WDT clearing AP also generates interrupts at a period shorter than the timeout period of the WDT processing device to prevent timeouts in the WDT processing device.

Noted that, in this Embodiment 1, the first OS 21 and the first AP region 31 are respectively an OS and an AP region to be used in a normal state. The second OS 22 and the second AP region 32 are respectively an OS for debugging and an AP region for debugging, both of which are capable of outputting logs for failure cause analysis and of monitoring the operational situation.

Also it is assumed that the first AP region 31 and the second AP region 32 are callable either from the first OS 21 and the second OS 22.

Although the example used in this embodiment included two OSs and two AP regions, the number of OS and AP may be one, or three or more. Also, the number of OSs and the number of the AP regions may be different numbers.

The OS for debugging and the AP region for debugging are provided in this embodiment, but they may not be provided.

Figure 4:
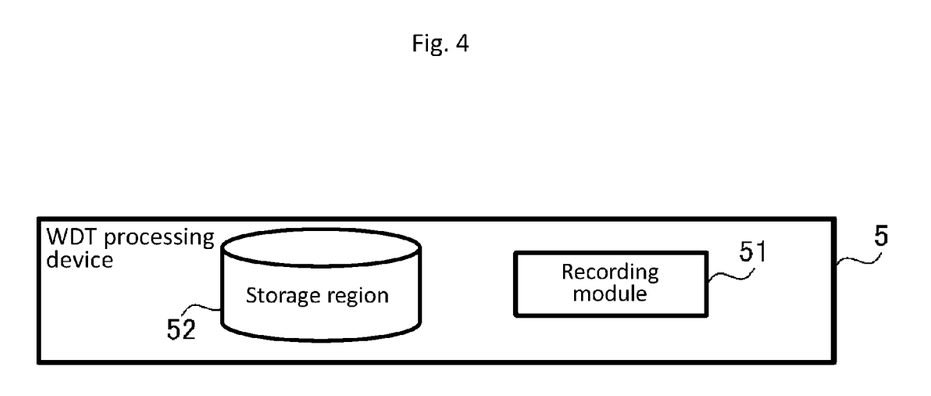
FIG. 4 is a block diagram showing a configuration of a WDT processing device of Embodiment 1.

FIG. 4 is a functional configuration diagram of the WDT processing device of this embodiment. Besides a function (not shown in the figure) for restarting the CPU 2 in response to the timeout of a timer in the WDT, the WDT processing device 5 is provided with a recording module 51 to collect information on the situation when the WDT expires and a storage region 52 to store the information collected by the recording module 51 on the situation when the WDT expires. Note that, in this Embodiment 1, although the storage region 52 is assumed to be a part of the WDT processing device 5, it may be a part of the storage device 4.

When the WDT expires, the recording module 51 stores the WDT timeout occurrence situation information 520 in the storage region 52.

Figure 5:
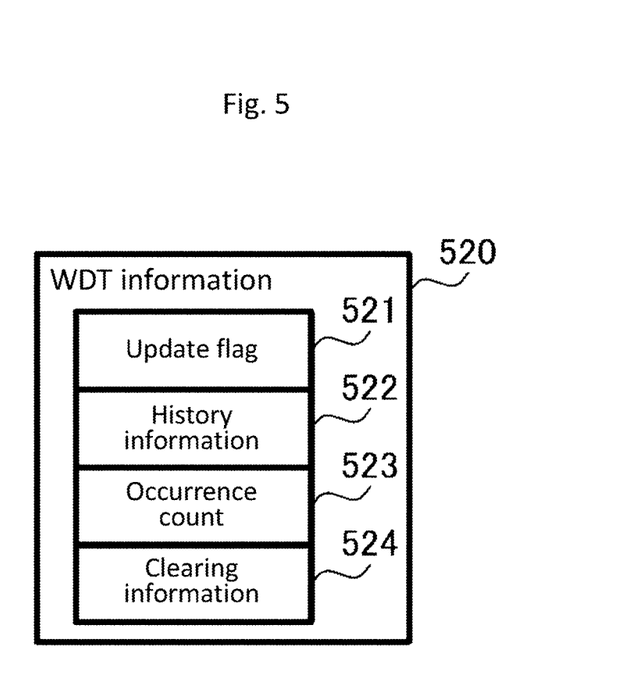
FIG. 5 is a block diagram showing a configuration of WDT information.

Note that, in this storage region, the information on which program has cleared the WDT may be recorded; that is, information that the WDT clearing processing in the OS has been performed or information that the WDT clearing AP has been performed may be recorded The detail of the WDT timeout occurrence situation information 520 is shown in FIG. 5. As shown in FIG. 5, the WDT timeout occurrence situation information 520 includes an update flag 521 indicating the WDT's timeout occurrence situation, history information 522 indicating which OS and AP region are selected from among a plurality of the OSs and a plurality of the AP regions, a WDT timeout occurrence count 523 indicating the number of timeouts having occurred after power was applied to the information processing device 1, and clearing information 524 indicating the program which last cleared the WDT.

The update flag 521 indicates the WDT's timeout occurrence situation, indicating a state of no timeout at the point immediately after power-on to the information processing device 1. When the WDT expires in the WDT processing device 5, the recording module 51 is called and the situation where the WDT timeout has occurred is written in the update flag 521. As for the value to be written in the update flag 521, for example, a value of "1" is written when the WDT expires, and a value of "0" is written when it does not expire.

The history information 522 is history information indicating which OS is selected from among a plurality of OSs and which AP region is selected from among a plurality of AP regions. The information is written by the bootloader 10. This makes it possible to record combinations of the booted OS and the activated AP region from among a plurality of OSs and a plurality of AP regions, so that the bootloader 10 can confirm which combination has already been tried so far. For example, if a unique identification number is assigned in advance to each of all the OSs and AP regions to be used in the information processing device 1, and if the values indicating the time and the position in sequence when they are used are recorded in relation to each of the identification numbers, it will be possible to determine which OS or AP region has already been used and which OS or AP region is currently used.

The occurrence count 523 is the timeout occurrence count of the WDT after power was applied to the information processing device 1, and is used for determination to change a currently running program. For example, a limit value against repetitive occurrence is preset as N, so that when the WDT timeout occurrence count exceeds N, the currently used OS will be switched to another OS, or the currently used AP region will be switched to another AP region.

The clearing information 524 is information indicating the program which has cleared the WDT last. For example, if the WDT is cleared in an OS, the information that the OS has cleared the WDT last is written in the clearing information 524 by the WDT processing device 5. Note that, simultaneously with processing in which an OS clears the WDT, the information that the OS has cleared the WDT last may be written in the clearing information 524.

Figure 6:
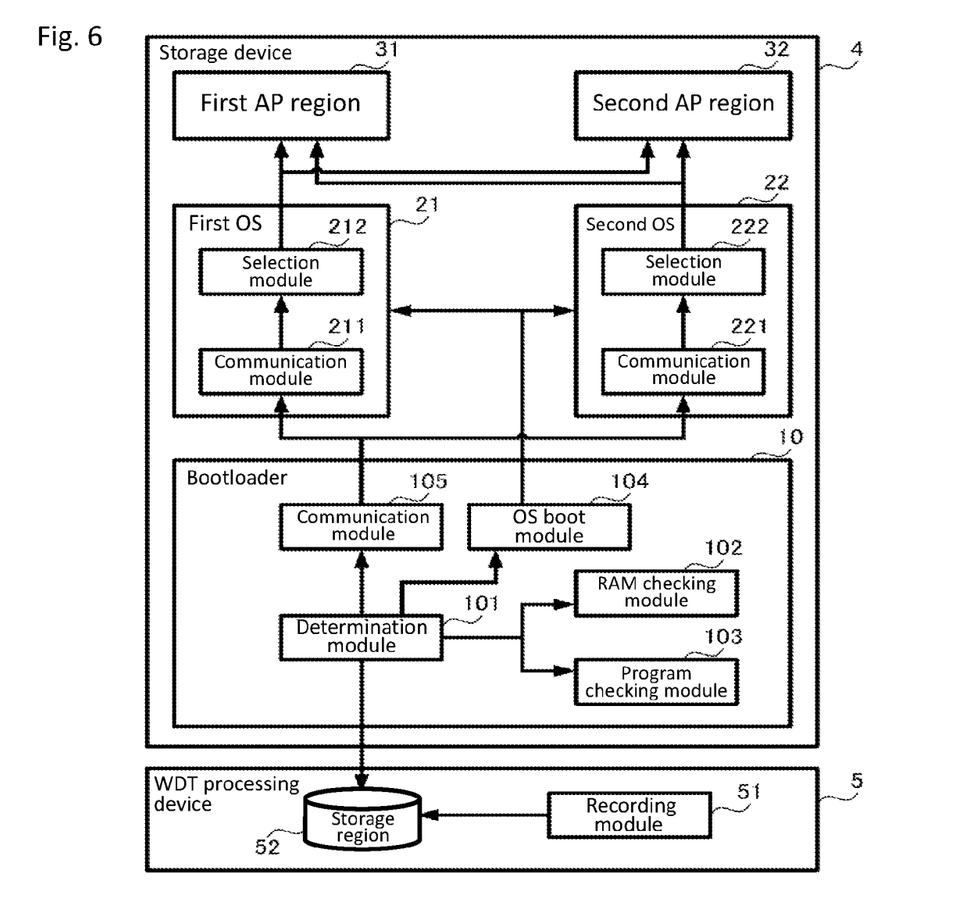
FIG. 6 is a functional configuration diagram of Embodiment 1.

With reference to FIG. 6, software modules according to this embodiment will be explained.

The bootloader 10 is a program which operates first when power is applied. After getting started, the bootloader 10 initializes the hardware and performs a setting process to boot the OS. When initializing the hardware, the bootloader 10 may, in some cases, check if there is a failure in the hardware such as RAM 3. When the hardware initialization is completed, the bootloader 10 makes an image copy of the OS from the storage device 4 into the RAM to boot the OS. Then, the operation of the bootloader 10 ends. The bootloader 10 includes: a determination module 101 to determine which OS is to be used from among the plurality of OSs (the first OS 21 and the second OS 22) and which AP region including an application and setting for enhancing a log output function thereof is to be used from among the plurality of AP regions (the first AP region 31 and the second AP region 32); a RAM checking module 102 called by the determination module 101 to check whether there is a failure such as a short-circuit in memory; a program checking module 103 also called by the determination module 101 to check whether there is no failure in the OS and the AP region to be started; an OS boot module 104 to boot the OS that the determination module 101 has determined to be used; and a communication module 105 to notify the OS of the AP region that the determination module 101 has determined to be used.

The first OS 21 includes: a communication module 211 to receive, from the communication module 105 of the bootloader 10, the information of the first AP region 31 or the second AP region 32 which is determined to be used; and a selection module 212 to activate the first AP region 31 or the second AP region 32 in accordance with the selection information notified of from the bootloader 10.

Similarly, the second OS 22 includes: a communication module 221 to receive, from the communication module 105 of the bootloader 10, the information of the first AP region 31 or the second AP region 32 which is determined to be used; and a selection module 222 to activate the first AP region 31 or the second AP region 32 in accordance with the selection information notified of by the bootloader.

Next, with reference to FIGS. 7 to 10, the operation of the information processing device 1 will be explained.

Figure 7:
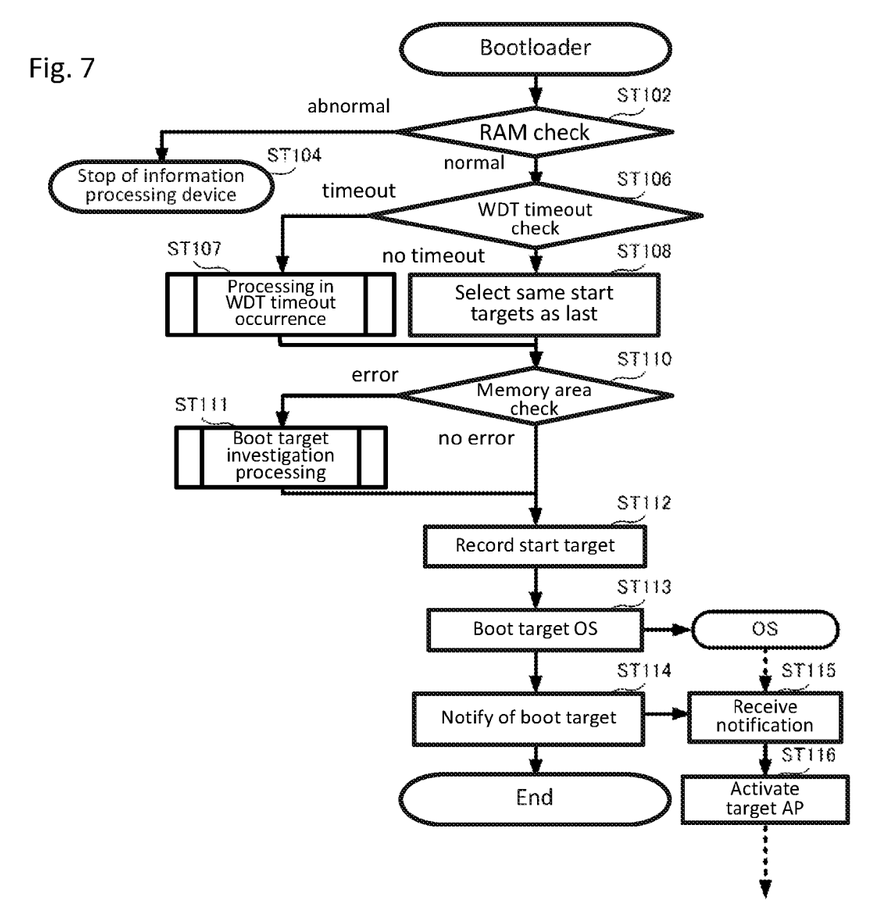
FIG. 7 is a flowchart showing operations of the information processing device of Embodiment 1.

FIG. 7 is a flowchart for explaining the operations of the bootloader 10 and the OS.

Power is applied to the information processing device 1 to start the bootloader 10. Also when the information processing device 1 is reset by the WDT processing device 5, the bootloader 10 is started. This operation will be explained later.

When the bootloader 10 is started, the determination module 101 is executed.

In the determination module 101, the RAM checking module 102 is called first to perform a RAM check (ST102). The method for the RAM check may be a simple one such as, first writing "0" in all the regions of the memory, and then reading all the regions to check whether they are all "0". The method for the RAM check may be a memory check method using a memory test algorithm such as Walking method, Galloping method or Marching method which can find a short-circuit in a data bus and an address bus.

If the RAM check finds an abnormality in the RAM, the determination module 101 stops the information processing device 1 (ST104) because the programs cannot be executed normally.

In a case of RAM abnormality, the bootloader displays on the screen or stores in the storage device 4: the fact that an abnormality is found in the memory; the address in which the abnormality is found; the value tried to be written in; and the value actually written in the memory. Then the system will be stopped.

In a case of display on the screen, if power supply is stopped, the screen will be blacked out. Therefore, the processing of the information processing device 1 has to be stopped with the power being applied. In a case where data remains safe even at a power outage in the storage device 4 and others devices, the system may be stopped with the power off.

Again in ST102, if the RAM check results in normal, the determination module 101 obtains the WDT information 520 and checks the WDT's timeout occurrence situation with reference to the update flag 521 (ST106).

If the determination module finds, with reference to the update flag 521 (ST106), that WDT resetting has not occurred, the determination module 101 selects an OS and an AP region that the information processing device 1 has used in the previous start operation (ST108). The order in which the OSs and the AP regions, included in the information processing device 1, have been executed is recorded in the history information 522, so that, with reference to the history information 522, the determination module 101 selects the OS and the AP region having been used in the previous start operation.

Immediately after power is applied, there is no information on the OS and the AP region having been used in the previous start operation. Therefore, the OS and the AP region to be used immediately after power is applied may be set in advance so that the system can follow the settings.

Again in ST106, if the determination module finds, with reference to the update flag 521, that the WDT has expired (a WDT timeout has occurred and the information processing device 1 has been reset), the determination module 101 selects a start target in accordance with the WDT's timeout occurrence situation (ST107).

Figure 8:
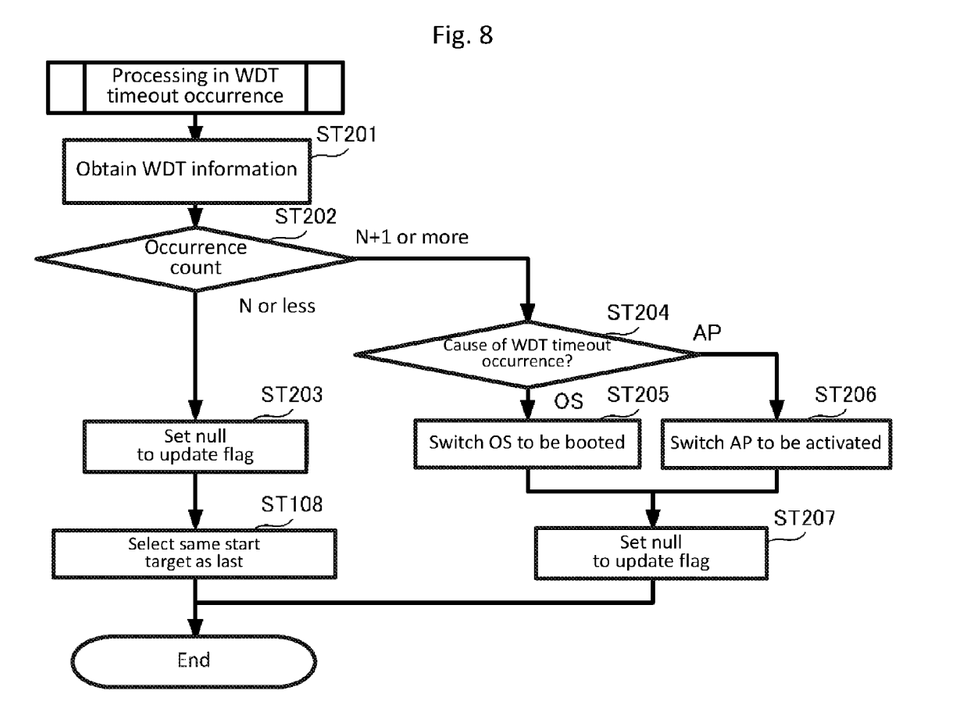
FIG. 8 is a flowchart showing processing at WDT timeout.

With reference to FIG. 8, selection of the start target in accordance with the WDT's reset occurrence situation will be explained.

First, the determination module 101 obtains the WDT information 520 included in the WDT processing device 5 (ST201).

Next, the determination module 101 compares the occurrence count 523 recorded in the WDT information 520 with a predetermined limit value N of the WDT timeout occurrence count (ST202). The predetermined number N is a value for checking the repetition frequency of the WDT. For example, if the system is required not to halt its operation as much as possible even when a failure occurs, N should be a small number like five so that the OS and the applications will be switched early to different ones in order to find a situation in which the WDT will not expire again after then.

On the other hand, if the system is required to keep operating as long as possible under a specific combination of an OS and applications, N should be a larger number like twenty.

If the occurrence count 523 is equal to or less than the predetermined number N, the determination module 101 sets null to the update flag 521 to indicate that the WDT has not expired (ST203).

The determination module 101 selects the OS and the AP region used in the previous start operation of the information processing device 1 (ST108).

Then, the determination module 101 calls the program checking module 103 to check (ST110) memory areas of the OS and the AP region selected in ST108.

Again in ST202, when the occurrence count in the WDT information 520 exceeds the predetermined N, the determination module 101 refers to the clearing information 524 recorded in the WDT timeout occurrence situation information 520 to determine whether it was an OS or an AP region that was running at the moment of the WDT's timeout (ST204). If the clearing information 524 indicates an OS, it can be determined that the WDT has expired because an abnormality has occurred somewhere in the OS operation. Similarly, if the clearing information 524 indicates an AP region, it can be determined that the WDT has expired while an application in the AP region was running.

If it is determined that an OS is responsible for the WDT timeout, the determination module 101 switches the boot target OSs (ST205).

In switching the boot target OSs, the determination module 101 refers to the history information 522. For example, if it is found that the first OS 21 has been executed in the past and the second OS 22 has not been executed in the past, the second OS 22 will be the boot target. Similarly, if it is determined that the AP region is responsible for the WDT timeout, the determination module 101 changes settings so as to switch the activation targets in AP regions. Similarly to the case in OS, the determination module 101 switches the activation targets in AP regions with reference to the history information 522.

The determination module 101 records the fact that no WDT timeout has occurred. Taking an example used in the explanation of FIG. 5, "0" is substituted for the update flag 521 (ST207).

Now explanation on FIG. 8 ends to return to explanation on FIG. 7.

The determination module 101 calls the program checking module 103 to check whether there is no failure in the memory areas assigned to the OS and the AP region selected as the start targets (ST110). Cyclic Redundancy Check, summation check or the like may be used to check whether there is no failure in the memory areas.

If the program checking module 103 resultantly finds an error in the memory areas, start target investigation processing will be performed (ST111) because at least one of the OS and the AP region that have been selected as the start targets cannot be started.

Figure 9:
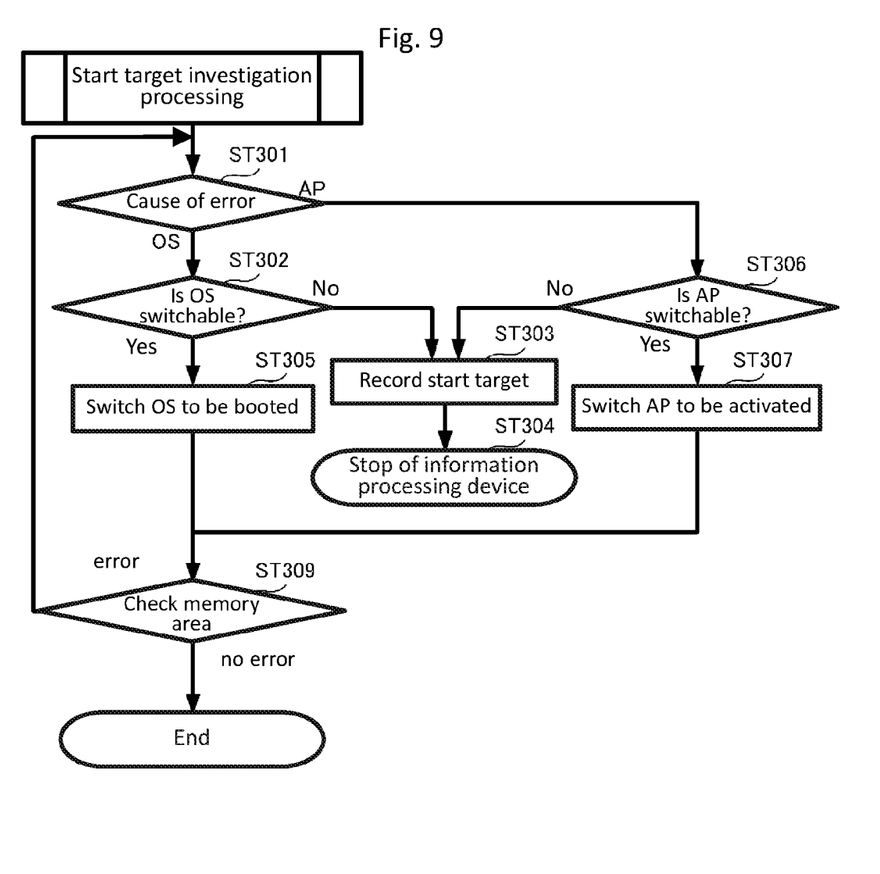
FIG. 9 is a flowchart showing start target investigation processing.

With reference to FIG. 9, explanation will be made about processing in a case where a failure is found in the memory areas assigned to the OS and the AP region selected as the start targets.

If the program checking module 103 resultantly finds a failure in the memory area of the OS (ST301), the determination module 101 refers to the history information 522 and checks whether an alternative OS other than the OS currently selected as the boot target exists (ST302).

If all the OSs have already been selected as the boot targets, and thus no other OS can be selected, in short if it is impossible to switch OSs, the determination module 101 inputs to and records in the history information 522, the information on the OS which was last tried as the boot target (ST303). As explained in FIG. 5, the information to be inputted only needs to include information by which the sequence of the selected start targets can be known.

Then the determination module 101 stops the information processing device 1 (ST304).

Again in ST302, if there is another OS to be selected, namely if switching is possible, the determination module 101 selects the OS to be booted next (ST305).

In switching the boot target OSs, the determination module 101 refers to the history information 522. For example, if the first OS 21 has been executed and the second OS 22 has not been executed, the second OS 22 will be selected as the boot target.

The determination module 101 calls the program checking module 103 to check whether there is no failure in the memory areas assigned to the OS and the AP region selected as the start targets (ST309).

If the program checking module 103 resultantly finds an error in the memory areas, the procedure returns again to the top (ST301) of the start target investigation processing because the OS or the AP region selected as the start target cannot be started. If no error is found, the start target investigation processing ends and the procedure returns to FIG. 7.

In FIG. 9, the process not explained so far will be explained next.

Again in ST301, if the program checking module 103 resultantly finds a failure in the memory area of the AP region, the determination module 101 checks whether an alternative AP region other than the AP region currently selected as the activation target exists (ST306).

If all the AP regions have already been selected as the activation targets, and thus no other AP region can be selected, in short if it is impossible to switch AP regions, the determination module 101 inputs to and records in the history information 522, the information on the AP region which was last tried as the activation target (ST303). Similarly to the case where a failure is found in the memory area of the OS, the information to be inputted only needs, as explained in FIG. 5, to include information by which the sequence of the selected activation targets can be known.

Then, the determination module 101 stops the information processing device 1 (ST304).

Again in ST306, if there is another AP region to be selected, namely if it is possible to switch AP regions, the determination module 101 selects the AP region to be activated next (ST307). The method for selecting an AP region to be activated next is the same as that for OS.

The determination module 101 calls the program checking module 103 to check whether there is no failure in the memory areas assigned to the OS and the AP region selected as the start targets (ST309).

If the program checking module 103 resultantly finds an error in the memory areas, the procedure returns again to the top (ST301) of the start target investigation processing because the OS or the AP region selected as the start target cannot be started. If no error is found, the start target investigation processing ends and the procedure returns to FIG. 7.

Now explanation on FIG. 9 ends to return to FIG. 7.

The determination module 101 inputs to and records in the history information 522, the information on the OS and the AP region selected as the start targets (ST112).

The determination module 101 executes the OS boot module 104 to boot the OS selected as the boot target (ST113). Note that it is assumed here that the first OS and the second AP region have been selected as the start targets.

The determination module 101 executes the communication module 105 to notify the OS selected as the boot target of the information on the AP region selected as the activation target (ST114).

The communication module 211 of the first OS 21 receives the information on the AP region selected as the activation target (ST115).

From this point on, when the first OS 21 executes an AP, the selection module 212 selects the second AP region 32 on the basis of the information on the AP region selected as the activation target. The first OS 21 activates an AP in the second AP region 32 (ST116).

Note that, in this embodiment, the information on the AP region selected as the activation target is communicated by using the communication module 105 in the bootloader 5 and the communication module 211 in the first OS 21. There may be another way in which the determination module 101 writes the information somewhere in the storage device 4 so that the OS can check the written information when booted.

Next, with reference to FIG. 10 and FIG. 11, the processing of the WDT processing device 5 will be explained. The processing of the WDT processing device 5 includes processing to be conducted when the OS or the AP clears the WDT, and processing to be conducted when the WDT is not cleared and then expires.

Figure 10:
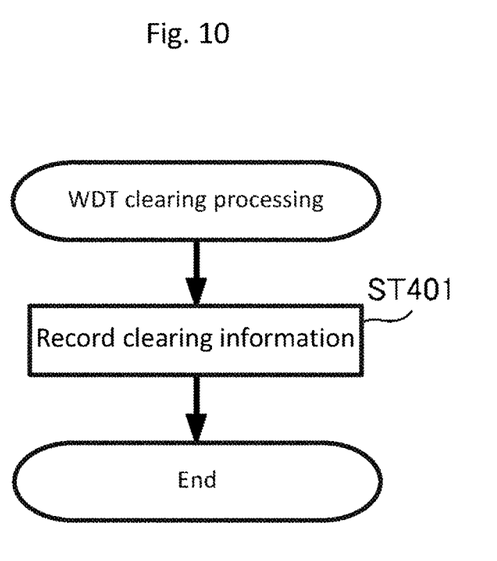
FIG. 10 is a flowchart showing how the WDT processing device operates when the WDT is cleared.

FIG. 10 is a flowchart of the WDT processing device 5 when the OS or the AP clears the WDT.

When the WDT is cleared by the WDT clearing processing in the OS or by the WDT clearing processing in the AP region, the WDT processing device 5 reads the change in a signal to extend the WDT timer. After extending the WDT timer, the WDT processing device 5 executes the recording module 51.

Referring to the storage region 52, the recording module 51 records the information on the program which performed the WDT clearing processing, in the clearing information 524 (ST401). In this embodiment, it is explained that the recording module 51 records the information on the program which performed the WDT clearing processing, in the clearing information 524. However, such information may be recorded by the WDT clearing processing in the OS or the WDT clearing AP, which are on the side for performing the WDT clearing processing.

Figure 11:
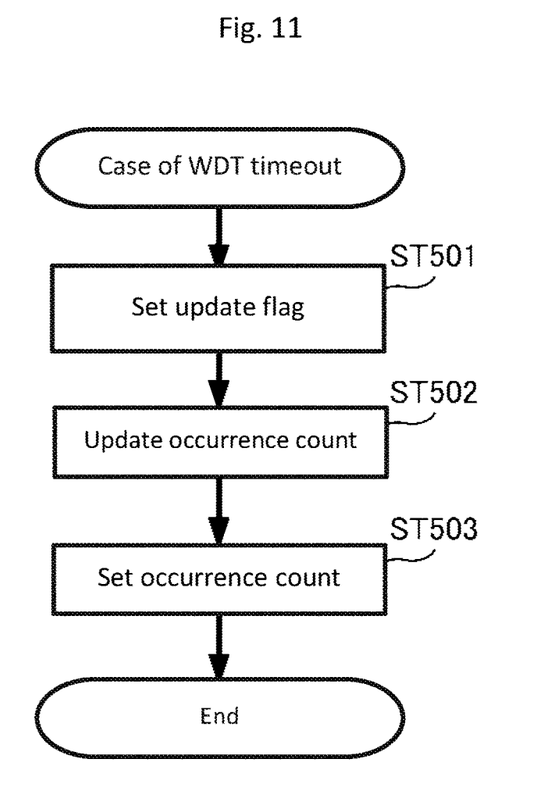
FIG. 11 is a flowchart showing how the WDT processing device operates when the WDT expires.

FIG. 11 is a flowchart of the WDT processing device 5 when no WDT clearing processing is performed from anywhere, resulting in a WDT timeout.

If the WDT is kept uncleared from anywhere, a timeout occurs. Then, the WDT processing device 5 executes the recording module 51; the hardware reset function is called; and the system restarts.

The recording module 51 sets to the update flag 521, a flag indicating that the WDT has expired (ST501).

Next, referring to the occurrence count 523, the recording module 51 adds one to the referred value (ST502) to record the resulting value in the occurrence count 523 (ST503).

Then, the WDT processing device 5 resets the information processing device 1.

With the configuration described above, by referring to the WDT information 520 recorded by the WDT processing device 5, the bootloader 10 can select an OS and an AP region to be started. The OS selected as a boot target can activate an AP in the AP region to be activated by receiving from the bootloader 10, the information on the AP region to be activated.

Depending on the control devices, a device such as a flash memory with a limitation number for rewriting may sometimes be used as a log recording media. In such a case, a problem is that the service lifetime of the flash memory will be shortened if a large amount of operating logs are always outputted.

If a normal AP in the AP region causes a failure in a system that is configured as described above and provided with a normal OS and the AP as well as those having an output function for debugging, the system can switch, while keeping running the normal OS, the AP in the AP region to that having the debugging-output function, thereby reducing unnecessary log information. As the result, a failure cause can be identified in a short time.

DESCRIPTION OF SYMBOLS

1: information processing device
2: CPU
3: RAM
4: storage device
5: WDT processing device
10: bootloader
21: first OS
22: second OS
31: first AP region
32: second AP region
51: recording module
52: storage region
101: determination module
102: RAM checking module
103: program checking module
104: OS boot module
105: communication module
211: communication module
212: selection module
221: communication module
222: selection module
520: WDT information
521: update flag
522: history information
523: occurrence count
524: clearing information

The invention claimed is:

1. An information processing device for monitoring a system for a hang-up due to a software failure, the information processing device comprising:
   a watch dog timer;
   a memory having stored therein a plurality of operating systems, a plurality of applications; and information identifying a program executed when the watch dog timer was last cleared;
   a processor configured to
      record watch dog timer occurrence situation information in the memory;
      select, when the watchdog timer expires, an application to be executed from among the plurality of applications, and an operating system to be executed from among the plurality of operating systems based on the information identifying the program executed when the watch dog timer was last cleared;
      execute the selected operating system, and
      notify the executed operating system of the selected application to be executed.

2. The information processing device according to claim 1, wherein if the information identifying the program executed when the watch dog timer was last cleared indicates that the program was an application, the processor selects from the plurality operating systems, the operating system corresponding to an operating system having been executed last; and
   if the information identifying the program executed when the watch dog timer was last cleared indicates that the program was an operating system, the processor selects from the plurality of applications, the application corresponding an application having been executed last.

3. The information processing device according to claim 2, wherein the processor further records a number of timeouts of the watchdog timer, and selects, when the number exceeds a predetermined number, the application to be executed and the operating system to be executed.

4. The information processing device according to claim 1, wherein the processor further records a number of timeouts of the watchdog timer, and selects, when the number exceeds a predetermined number, the application to be executed and the operating system to be executed.

* * * * *